United States Patent
Unger et al.

(10) Patent No.: US 6,174,369 B1
(45) Date of Patent: Jan. 16, 2001

(54) DEVICE FOR IMPREGNATION OF WEBS OF POROUS MATERIALS

(75) Inventors: Udo Unger, Leichlingen; Wolfram Dürr, Krefeld, both of (DE)

(73) Assignee: Vits Maschninenbau GmbH, Langenfeld (DE)

(*) Notice: Under 35 U.S.C. 154(b), the term of this patent shall be extended for 525 days.

(21) Appl. No.: 08/596,734

(22) Filed: Feb. 5, 1996

(30) Foreign Application Priority Data

Feb. 7, 1995 (DE) .............................................. 295 01 919

(51) Int. Cl.[7] ....................................................... B05C 3/02
(52) U.S. Cl. .............................. 118/410; 118/419; 68/158; 68/175; 68/181 R; 68/202; 162/56; 162/265
(58) Field of Search ........................ 68/158, 175, 181 R, 68/202; 162/56, 265; 118/410, 419

(56) References Cited

U.S. PATENT DOCUMENTS

| 419,331 | * | 10/1890 | Hodgson | 68/175 |
|---|---|---|---|---|
| 2,542,819 | * | 2/1951 | Kropa | 118/419 |
| 2,779,183 | * | 1/1957 | Fornelli | 68/175 |
| 3,626,449 | * | 12/1971 | Arashi et al. | 68/158 |
| 3,730,680 | * | 5/1973 | Bowen et al. | 68/181 R |
| 3,738,131 | * | 6/1973 | Inomata et al. | 68/177 |
| 4,702,943 | * | 10/1987 | Long | 118/419 |
| 4,740,391 | * | 4/1988 | Long | 118/419 |
| 4,849,261 | * | 7/1989 | Long | 118/419 |
| 4,982,686 |   | 1/1991 | Long . | |

FOREIGN PATENT DOCUMENTS 0173519  8/1985  (AT) .

* cited by examiner

Primary Examiner—Stanley S. Silverman
Assistant Examiner—Michael P. Colaianni
(74) Attorney, Agent, or Firm—Michael J. Striker

(57) ABSTRACT

A device for impregnation of webs of porous materials with a liquid impregnating medium under increased pressure comprises a roller rotatable about a horizontal axis, a trough arranged so that the roller is partially inserted in the trough to form a chamber between an inner surface of the trough and an outer surface of the roller, a unit for supplying an impregnating medium into the chamber, and a unit forming an inlet slot for introducing a web to be impregnated into the chamber and an outlet slot for withdrawing the impregnated web from the chamber. The chamber over a path from the inlet slot to the outlet slot narrows and again increases many times.

3 Claims, 2 Drawing Sheets

DEVICE FOR IMPREGNATION OF WEBS OF POROUS MATERIALS

BACKGROUND OF THE INVENTION

The present invention relates to a device for impregnation of webs composed of porous materials.

More particularly, it relates to an impregnating device which has a roller rotatable about a horizontal axis, a trough for dipping in at least partially with a chamber provided between the trough and the roller, and an impregnating medium supply insert in the chamber.

Devices of the above mentioned general type are known in the art. One of such devices is disclosed for example in the patent document EP 0 173 519 B1. In this device the impregnation is performed with a liquid impregnating medium under increased pressure. Thereby substantially greater quantities of the impregnating medium can be introduced into substrate than in the case of pressureless impregnation. It is for example possible to impregnate dense paper with low suction properties. Furthermore, there is also a possibility to use impregnating media with high viscosity, or in other words with high solid matter content and low solvent matter content. The required pressure increase is obtained in particular so that the chamber which receives the impregnating medium continuously narrows from an inlet slot in direction toward an outlet slot. The throughgoing web drives the border layer of the impregnating medium adhering to its outer surface into the narrowing region of the chamber. Thereby the pressure in the chamber increases in direction toward the outlet slot. With through go speeds of substantially 45–60 m/s, and the conditions disclosed in the reference a pressure in the vicinity of the outlet slot which is the value which is substantially over 1 MPa. When the impregnating medium is supplied by a pressure pump, the static pressure produced by the pressure pump adds to the dynamic pressure produced in the chamber.

SUMMARY OF THE INVENTION

Accordingly, it is an object of the present invention to provide a device of the above mentioned general type for impregnating of webs of porous materials, which is further improved over the existing devices.

In keeping with these objects and with others which will become apparent hereinafter, one feature of the present invention resides, briefly stated, in a device for impregnation of webs of porous materials, in which a chamber formed between the trough and the roller is reduced and expanded many times over a path from the inlet slot to the outlet slot.

When the device is designed in accordance with the present invention its efficiency is further increased.

In accordance with another feature of the present invention, the line obtained in a cross-section of the inner surface of a base body of a trough is a saw-tooth line.

On the other hand, in accordance with a further feature, the line which is provided in the cross-section of the inner surface of the base body of the trough can be a waved line. This provides for the improvement of the inventive device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
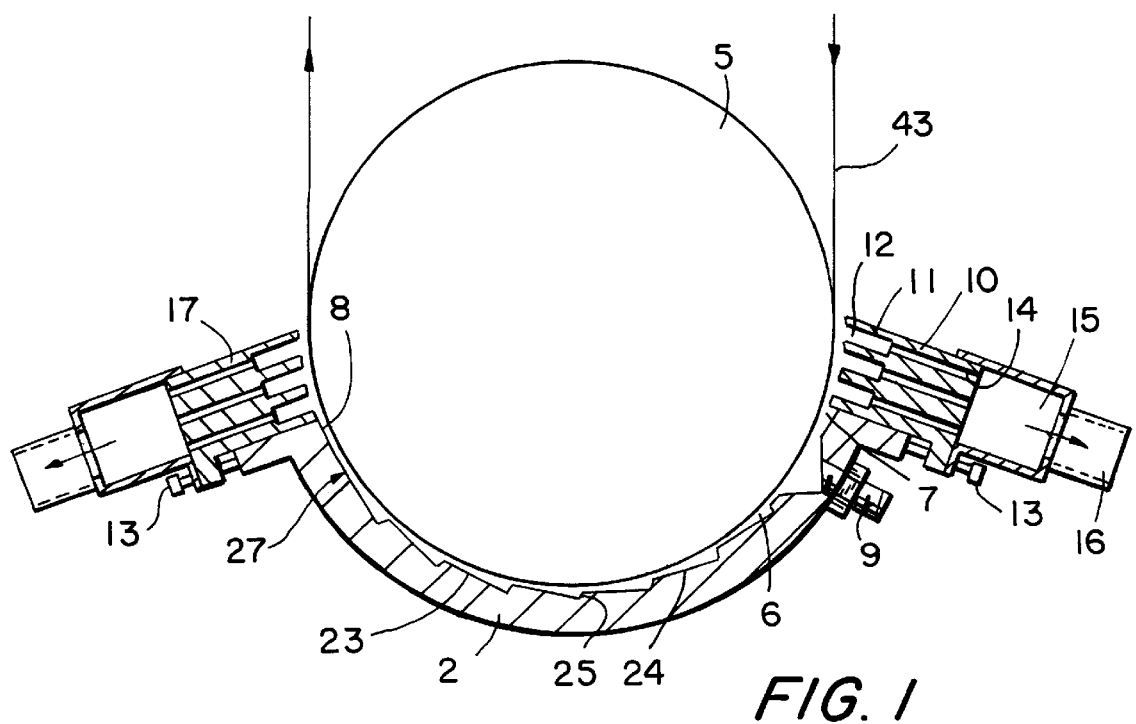
FIG. 1 is a view showing a cross-section of a device for impregnation of webs of porous materials in accordance with one embodiment of the present invention.
Figure 2:
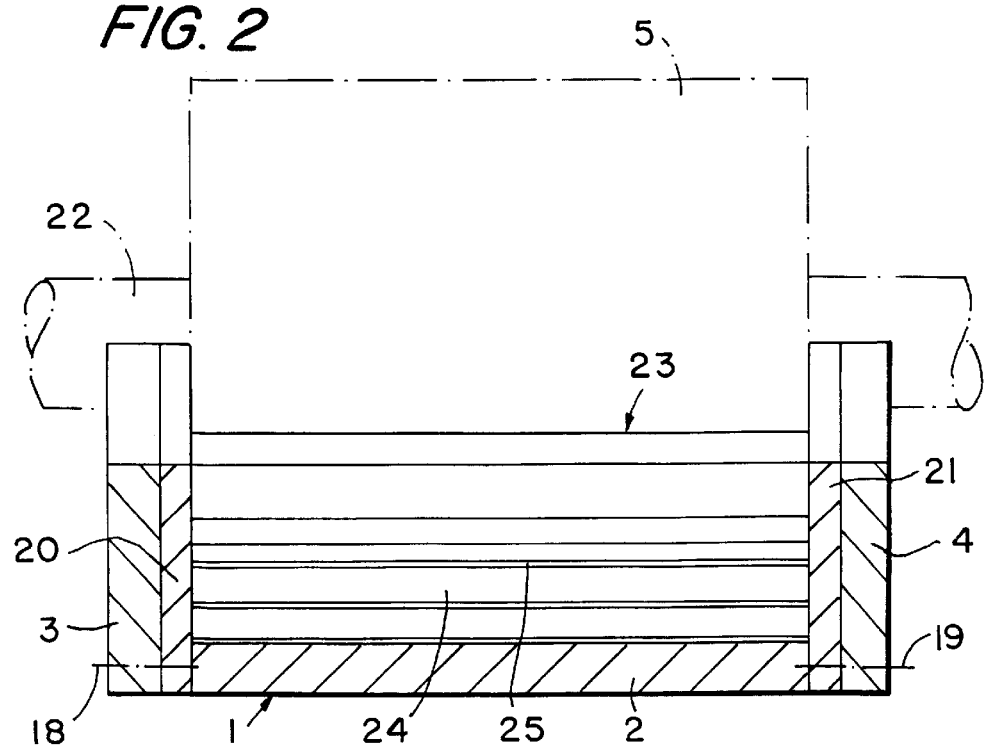
FIG. 2 is a view showing a longitudinal section of a trough with a roller of the inventive device shown in FIG. 1.

A device for impregnation of webs of porous materials has a trough which is identified as a whole with reference numeral 1. The trough is essentially composed of a base body 2 and flat end walls 3 and 4. A roller 5 is inserted partially in the trough 1. The roller 5 is rotatably supported in a not shown frame which is liftable and lowerable. The roller 5 is also connected with a not shown drive for rotating the roller.

The base body 2 of the trough 1 has an arcuate cross-section and forms approximately a half cylinder. A chamber 6 is formed between the inner surface of the base body toward the trough 1 and the outer surface of the roller 5. The chamber 6 has an inlet slot 7 and an outlet slot 8. A paper web 43 to be coated is introduced through the inlet slot 7 into the chamber 6 and is withdrawn from the chamber 6 through the outlet slot 8.

A supply element 9 for supplying an impregnating medium is introduced into the chamber 6 in the vicinity of the inlet slot 7 of the chamber 6. The supply member 9 extends through the base body 2 and is connected with a not shown pressure pump which supplies the impregnating medium under pressure.

A sealing block 10 is arranged on the inlet slot 7 and extends from the end wall 3 to the end wall 4. At the side which is opposite to the roller 5, alternating strips 11 and grooves 12 are formed so as to form a comb-shaped structure as shown in a cross-section in FIG. 1. An interrupted line which surrounds in cross-section the outer surfaces of the strips corresponds to a cross-section of the roller. Therefore, narrow gaps are produced between the outer surfaces of the strips 11 and the outer surface of the roller 5. The width of the gaps can be adjusted by an approximately radial fine adjustment, for example by a screw 13 shown in FIG. 1. Each groove 12 is provided with several outflow openings 14 distributed over the length and extending through the sealing block 10 so as to open into a passage 15. A discharge pipe 16 extends from the passage 15. A corresponding sealing block 17 is also mounted on the outlet gap 8.

The end walls 3 and 4 are connected with the base body 2 by screws 18 and 19. A sealing plate 20 extends between the end wall 3 and the base body 2, while a sealing plate 21 extends between the end wall 4 and the base body 2. The sealing plates 20 and 21 are substantially semi-circular and each provided with a recess in the region of the shaft trunions 22. They are composed of a wear resistant synthetic plastic material which has a low friction coefficient with respect to metal.

In contrast to a device in accordance with the prior art, the chamber 6 has a cross-section which along a path from the inlet slot 7 to the outlet slot 8 is several times reduced and increased successively. For example, the inner wall 23 of the base body 2 is formed so that in a cross-section it is represented by a line formed as a saw tooth curve, as shown in FIG. 1. In the embodiment shown in FIG. 1, this line has five teeth. In practice, it can have up to substantially fifteen teeth.

Each saw tooth has a flank 24 which flatly rises in the movement direction and a steeply falling flank 25 located behind the tooth tip. The tooth tip has a smallest possible distance from the outer surface of the roller 5, which however is sufficiently great to prevent damages to the web to be impregnated in particular to prevent web fissures. The distance to the tooth tips is adjustable, for example by lifting of the roller 5 and can be adjusted to the thickness of the web. The maximum distance between the roller 5 and the inner wall 23 is substantially greater. The cross-section of the chamber in the region of a rear portion 27 near the outlet slot 8 is constant. The distance between the inner wall 23 and the roller 5 in this region is relatively narrow, substantially corresponding to the distance between the tooth tips and the roller.

During the operation of the device for impregnation of webs of porous materials in accordance with the present invention, a paper web 43 to be impregnated surround the roller 5 approximately over the half of its periphery and is supplied through the inlet slot 7 to the chamber 6. The impregnated web leaves the chamber 6 through the outlet slot 8. Impregnating medium is supplied through the supply member 9 into the chamber 6, preferably under increased pressure of substantially 1.0 MPa, for example at approximately 0.2 MPa.

In connection with the dragging effect of the moving paper web which provides the static pressure for supplying the impregnating medium, the narrowings and expansions of the chamber 6 also provide a location-dependent dynamic pressure component which superposes with the static pressure component. A pressure gradient is formed over the rising tooth flanks 24, so that the pressure in direction to the tooth tips increases. The pressure drops behind each tooth tip. Each point of the paper web 43 during its path through the chamber 6 is therefore repeatedly compressed and again released as a sponge. Thereby, the impregnating medium is intensely pressed into the pores of the paper web.

Figure 3:
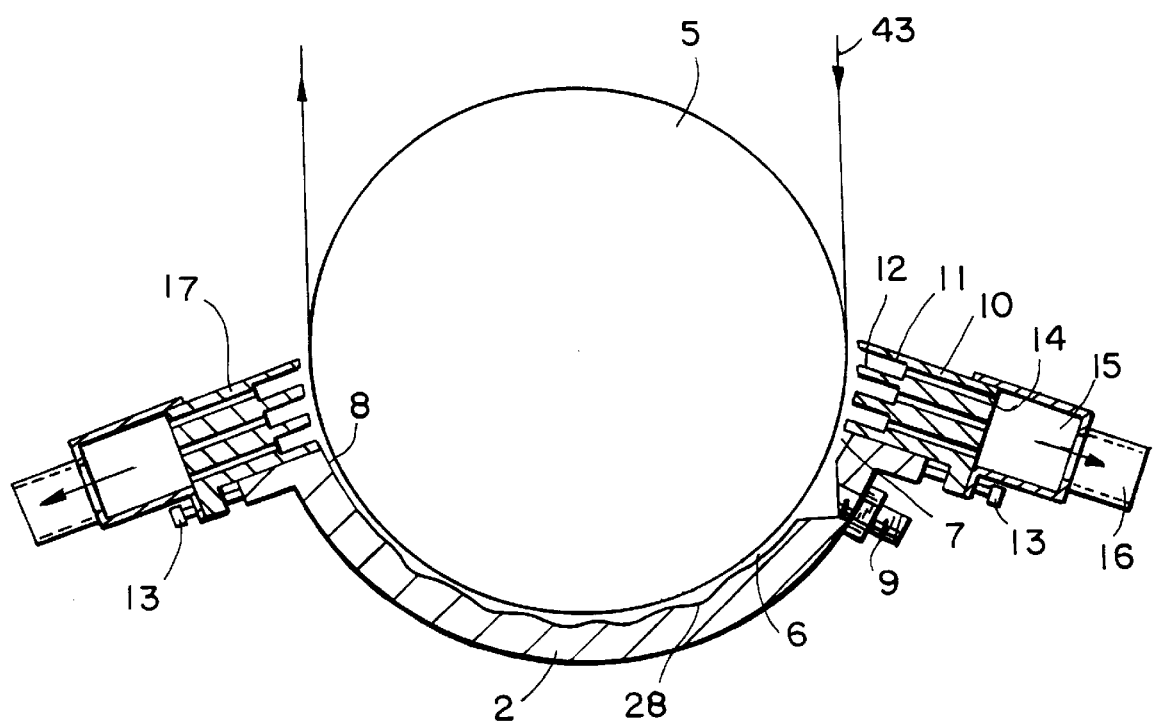
FIG. 3 is a view showing a cross-section of the device for impregnation of webs of porous materials in accordance with another embodiment of the present invention.

In the embodiment shown in FIG. 3, the inner wall 28 of the base body 2 is waved. The line produced in the cross-section of the inner wall 28 is a continuously curved wave line. The distance between the inner wall 28 and the roller 5 in the region of the wave peaks is so small as can be allowed to provide a disturbance free operation.

The operation of the device shown in FIG. 3 is similar to the operation of the device shown in FIG. 1. A location-dependent dynamic pressure component is produced, which in the region of the narrowings is greater than at the region of the expansions.

It will be understood that each of the elements described above, or two or more together, may also find a useful application in other types of constructions differing from the types described above.

While the invention has been illustrated and described as embodied in a device for impregnation of webs of porous materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for impregnation of webs of porous materials with a liquid impregnating medium under increased pressure, comprising a roller rotatable about a horizontal axis; a trough arranged so that said roller is partially inserted in said trough to form a chamber between an inner surface of said trough and an outer surface of said roller; means for supplying an impregnating medium into said chamber; and means forming an inlet slot for introducing a web to be impregnated into said chamber and an outlet slot for withdrawing the impregnated medium from said chamber, said chamber having a cross-section which over a path from said inlet slot to said outlet slot narrows and again increases many times; and sealing means for sealing said inlet slot and said outlet slot.

2. A device as defined in claim 1, wherein said trough has an inner surface facing toward said roller and having such a shape that in a cross-section it forms a saw-tooth line.

3. A device as defined in claim 1, wherein said trough has an inner surface facing toward said roller and having such a shape that in a cross-section it forms a wave line.

* * * * *